United States Patent
Oral et al.

(10) Patent No.: US 8,010,613 B2
(45) Date of Patent: Aug. 30, 2011

(54) SYSTEM AND METHOD FOR END-USER MANAGEMENT OF E-MAIL THREADS USING A SINGLE CLICK

(75) Inventors: Tolga Oral, Winchester, MA (US); Sergei R. Landar, Cambridge, MA (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 11/753,149

(22) Filed: May 24, 2007

(65) Prior Publication Data

US 2008/0294730 A1 Nov. 27, 2008

(51) Int. Cl.
*G06F 15/16* (2006.01)

(52) U.S. Cl. ........ 709/206; 709/203; 709/204; 709/205; 709/207

(58) Field of Classification Search ........... 709/203–207
See application file for complete search history.

(56) References Cited

U.S. PATENT DOCUMENTS

| | | | |
|---|---|---|---|
| 2002/0049806 A1* | 4/2002 | Gatz et al. | 709/203 |
| 2003/0028607 A1* | 2/2003 | Miller et al. | 709/206 |
| 2003/0071846 A1 | 4/2003 | Balassanian | |
| 2003/0177190 A1 | 9/2003 | Moody et al. | |
| 2004/0088359 A1 | 5/2004 | Simpson | |
| 2005/0060643 A1* | 3/2005 | Glass et al. | 715/501.1 |
| 2005/0117715 A1 | 6/2005 | Bordia | |
| 2005/0174975 A1* | 8/2005 | Mgrdechian et al. | 370/338 |

FOREIGN PATENT DOCUMENTS

| | | | |
|---|---|---|---|
| JP | 2005011152 A | 1/2005 | |
| JP | 2005243025 A | 9/2005 | |

\* cited by examiner

*Primary Examiner* — Phuoc Nguyen
*Assistant Examiner* — Clarence John
(74) *Attorney, Agent, or Firm* — Raymond Szeto; Hoffman Warnick LLC (57) ABSTRACT

The present invention provides various simple and easy ways for each end user to manage the thread in a way that suits them. In some cases, the user experience requires only a single click. Additional embodiments allow user to manage inbox space, recover suppressed threads, be alerted on contextual changes of such threads, and so forth. The system allows the user to specifically configure his/her own email thread management scheme by selecting an email and choosing "Suppress Thread" on his/her user interface. The system then performs a number of steps such as examining the <message-id> and <references> headers of the selected email to configure the suppress filter. Once configured, the system will examine each email as it is received and examine its <message-id> and <references> headers per RFC 822. If the headers match the configured <messageid> and <responses> headers, the emails will be suppressed in the manner chosen by the user such as deletion or move to folder.

5 Claims, 7 Drawing Sheets

SYSTEM AND METHOD FOR END-USER MANAGEMENT OF E-MAIL THREADS USING A SINGLE CLICK

FIELD OF INVENTION

The invention relates generally to a system and a method for managing email threads, and, more particularly, to a system and method for allowing users to suppress or otherwise control specific aspects of email threads through a single click.

BACKGROUND OF INVENTION

Emails are used not only for person to person communication but also to communicate questions, information and discussions to a large group of people. When people send emails to large lists of recipients through cooperative groups (e.g., LDAP groups), mailing lists or custom list of people, they often use "Reply to All" functionality so that no one is inadvertently dropped from the email thread. Use of "Reply to All" will forward the email created to everyone who was a recipient of the replied to email (i.e., everyone listed in the "To", "CC", and "BCC" address fields) including the original sender.

As a matter of background, a thread in computer science is short for a thread of execution. Threads are a way for a program to split itself into two or more simultaneously (or pseudo-simultaneously) running tasks. Multiple threads can be executed in parallel on many computer systems. An email thread or topic thread, however, is different. A topic thread (or simply "thread" when used in context) is a group of messages or postings to a newsgroup, mailing list, hypermail, blog or Internet forum, all relating to a single topic. An e-mail client or news client is said to have "threaded topics" if it groups messages on the same topic together for easy reading.

Figure 1:
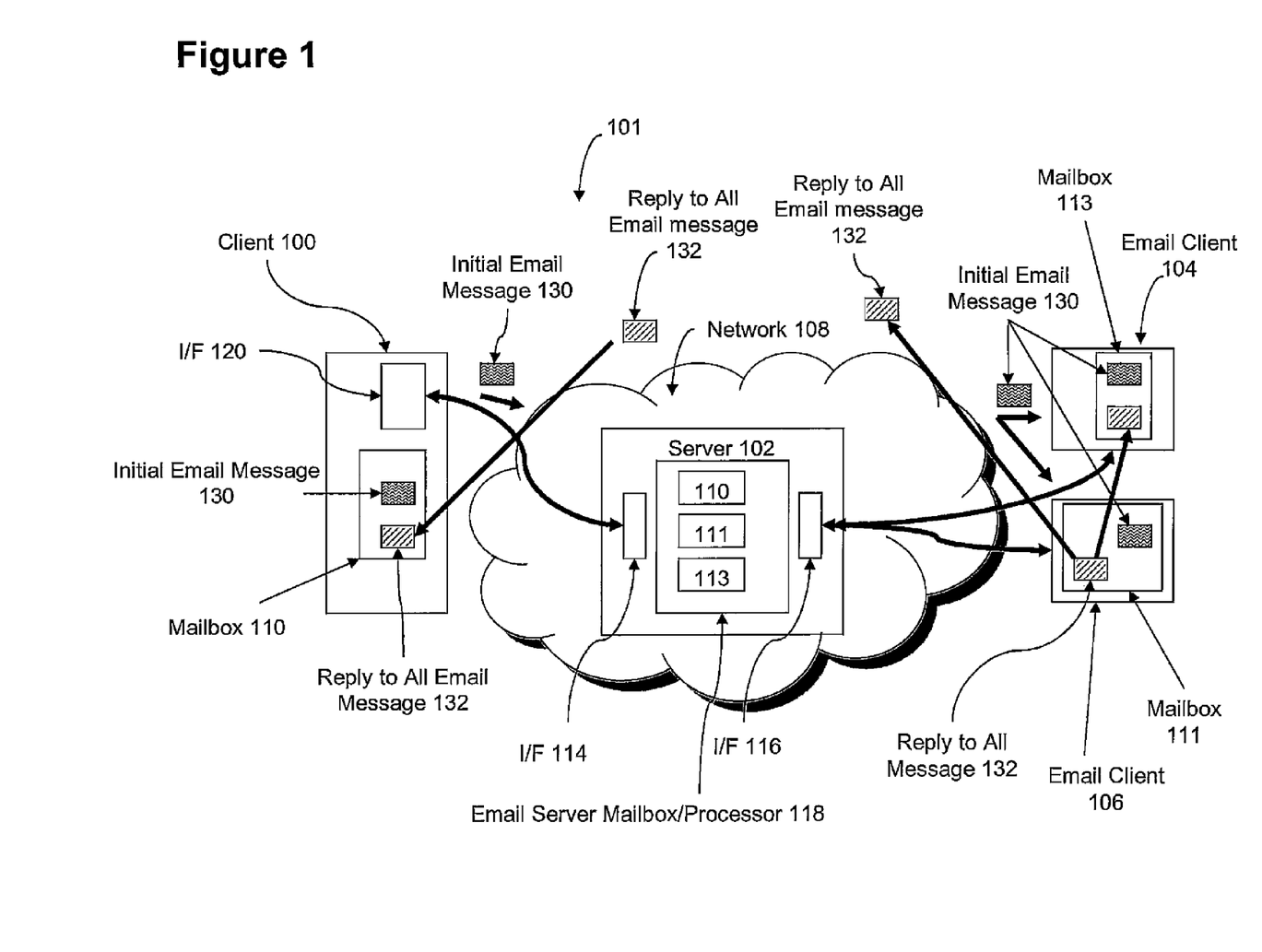
FIG. 1 is a block diagram showing the general components of a computer system that can be used to automated a workflow according to an embodiment of the present invention.

In FIG. 1, a basic Email System 101 is shown to illustrate this point. Email System 101 has Email Client 100, Email Server 102 and Email Clients 104 and Email Client 106. Of course, many more email clients could be connected through Email Server 102 and many more email servers interconnected within Network 108. Email Client 100 communicates with Email Client 104 and Email Client 106 through Email Server 102 and, in this example, in an email communication. Of course, the clients could be communicating via text messaging—TM—or instant messaging—IM. Alternatively, Email Client 100 and Email Clients 104, 106 may be connected directly for email communication in a "peer to peer" configuration. Email Server 102 is shown within a Network 108 which may be of the many various forms such as Internet, local area network (LAN), MAN, etc. Email Server 102 has an Interface (I/F) 114 and I/F 116 for interfacing with Email Clients 100, 104, 106 (and others). Email Server 102 further has an Email Mailbox/Processor 118 for processing and storing email communications between Email Client 100 and Email Clients 104, 106. This can be seen as Email Server 102 has Mailbox Components 110, 111, and 113.

Email Client 100 has an I/F 120 for interfacing with the Network 108 and Email Server 102. Likewise, Email Clients 104, 106 have interface components for interfacing with the Network 108 and Email Server 102. Email Client 100 has a Mailbox Component 110 for providing email communications 130 with Email Client 104 through the Network 108 and Email Server 102 and for storing received emails. Likewise, Email Clients 104, 106 each has a Mailbox Component 113, 111 for providing email communications 130 with Email Client 100 through the Network 108 and Email Server 102.

The Mailbox Components 110, 111 and 113 of Email Clients 100, 104, 106 correspond to the Mailbox Components of Email Server 102 and, for some applications, the Server Mail Components replicate to the Client Mail Components so that the Client Mail Components are local to the user. However, this is not germane to this invention. (Further information on this topic can be found at http://en.wikipedia.org/wiki/Replication_%28computer_science%29.)

In the course of an email "discussion", an Email Message 130 is sent to a number of parties such as Email Clients 104, 106. Email Client 104 "replies to all" with a Reply to All Message 132 so that it is sent to all of the initial recipients and the initial sender. This creates an email thread which is characterized by a common sender/recipient list. This, of course, can occur many times causing lots of activity at a user's mailbox.

In some cases this is desired, however, often a large part of the audience will find that particular parts of the conversation aren't relevant to them. Those people will find their email in-boxes cluttered with messages they don't want to receive, requiring that they waste time and energy manually disposing of the unwanted messages. Requesting participants not to use "Reply to All" adds more noise and confusion, with the likely prospect that people who are interested in the conversation will be dropped inadvertently.

The present invention, unlike the present state of the art, provides various simple and easy ways for each end user to manage the thread in a way that suits them. In some cases, the user experience requires only a single click.

One way, in the present state of the art, of handling unwanted email is spam filtering. (One could argue that any unwanted email in a user's inbox is spam.) However, spam filters are not flexible enough to remove unwanted mail in a thread without losing important information as spam filters are not aware of the particular structures and contexts of message threads.

An Active Filtering proxy filters electronic junk mail (also known as spam, bulk mail, or advertising) received at a Message Transfer Agent from remote Internet hosts using the Simple Mail Transfer Protocol (SMTP). The proxy actively probes remote hosts that attempt to send mail to the protected mail server in order to identify dial up PCs, open relays, and forged email. The system provides multiple layers of defense including: connect-time filtering based on IP address, identification of dial-up PCs attempting to send mail, testing for permissive (open) relays, testing for validity of the sender's address, and message header filtering. A sender's message must successfully pass through all relevant layers, or it is rejected and logged. Subsequent filters feed IP addresses back to the IP filtering mechanism, so subsequent mail from the same host can be easily blocked.

Since this technology identifies and restricts email by types and instances of sources, there is no good methodology to correctly filter only unwanted threads.

The most obvious alternative to the proposed invention is to use "Mail Rules" provided by most streamlined email Clients. One disadvantage is that mail rule creation requires an understanding of an advanced and often complex user interface. It is also a very manual process requiring specification of a number of conditions, not a one button feature.

For instance, the user could create a mail rule such as "IF SUBJECT CONTAINS xxxoldsubjecttextherexxx DELETE EMAIL". As this functionality depends on the email subject words in the Subject field, it doesn't resolve all the cases. Users can easily change the email subject to make it unrecognizable or emails with similar subjects might get deleted depending on the subject of the email thread.

In another case, the user could create a mail rule including the message-id and references field on the MIME header. Even though this might result in the desired functionality, it would be very hard for even experienced and advanced email users to master. This also requires the email client software to provide a user interface to such fields so that the user can program complex mail rules. However, email rules have to make assumptions about the subject or the sender while in real life email threads may have a subject line altered and an email sender may be a person shadowed by a group of recipients.

As shown at http://my.opera.com/community/tips/filter-guide/index3.dml, an Active Thread is automatically generated by Opera Mail when a user receives a reply from someone to a message the user has sent. This may happen during the current session or at the next startup. The original sent message and replies will be grouped into an access point. This usually works better than filtering messages with the same subject line because Active Threads recognize the right messages even if the subject line has been completely changed. E-mail belonging to an Active Thread is characterized by the Message-ID and References header. A filter can't be made having the same functionality, since Message-ID's are unique and unpredictable. The Opera email client does not provide the functionality of the present invention.

IBM's Lotus® Notes® Release 7 has a function for filtering new mail using rules, but the functionality does not achieve the flexibility of this invention. In the present Lotus Notes Release 7 ("Notes"), a user can use mail rules to have Notes act automatically on new messages the user receives that meet certain conditions. For example, the user could create a rule that checks for messages from a certain sender or that contain a certain subject and have Notes automatically move the messages to a certain folder, send copies of the messages to someone, or delete unwanted messages before the user ever sees them in them Inbox.

Notes stores the mail rules the user creates in the Rules folder in the user's mail database. The user can go there to add new rules as well as work on the ones the user has created. For example, the user can edit rules, change their order so that one rule has priority over another, turn them off when the user doesn't want to use them, or delete them entirely.

Figure 2:
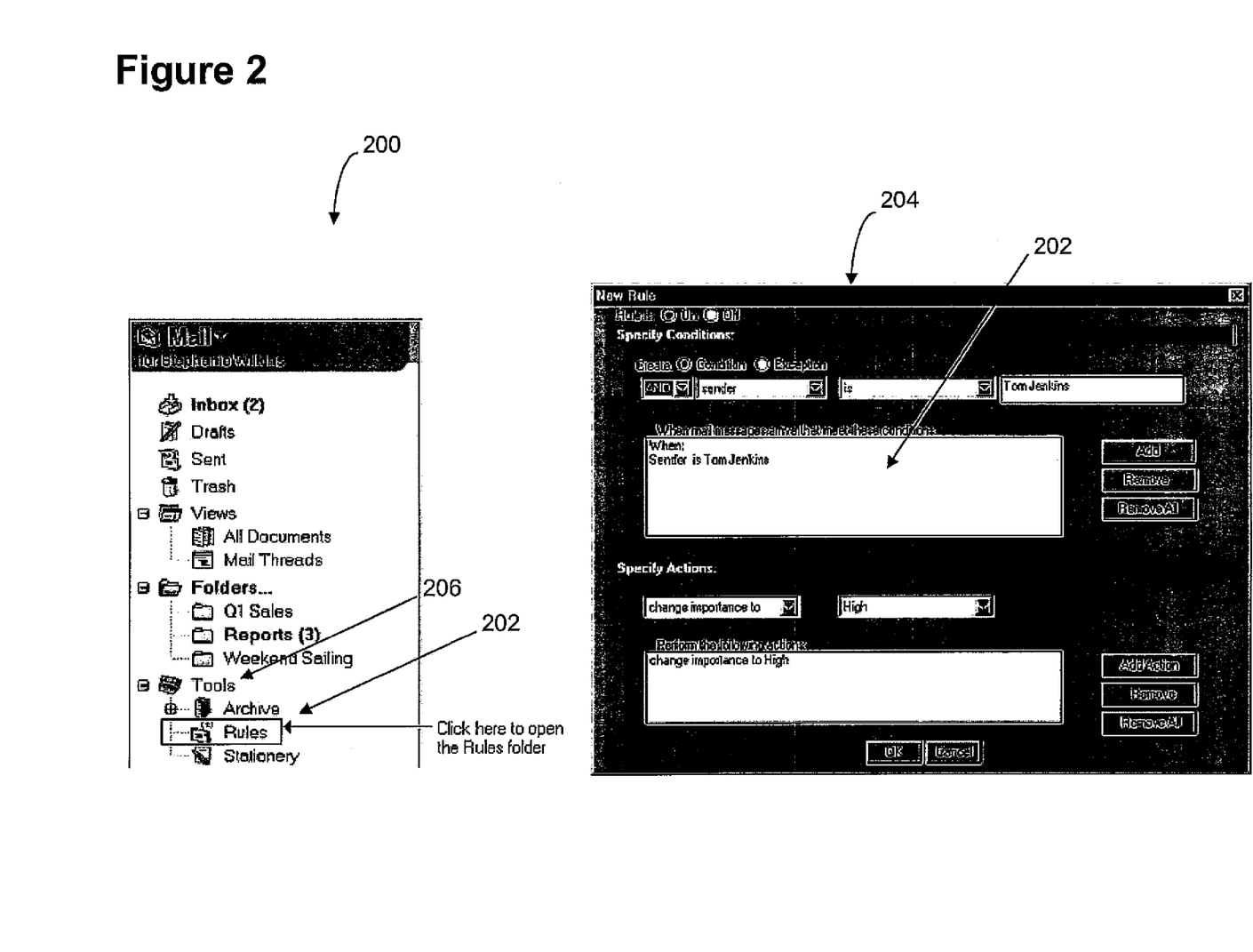
FIG. 2 shows a user interface of a prior art email client.

This can be seen at FIG. 2 where the user interface of a mail client is shown at 200. First, the user needs to figure out that there even is a mail rules option then to find it under the "Tools" drop-down 206. Once that is figured out, "Rules" 202 may be selected causing a "New Rule" window 204 to appear. From there, the user needs to understand how to set a rule. More information can be found here: http://www-12.lotus-.com/ldd/doc/domino_notes/Rnext/help6_client.nsf/b3266a3c17f9bb7085256b87 0069c0a9/66f679f4614e451385256c1c0037da0d?OpenDocument.

Newsgroups had somewhat similar functionality in newsgroup readers. Since postings on newgroups are associated at the source—such as discussions (where user posts reply to a specific thread generating the nesting structure deliberately)—it is much easier to control the user's views of discussion threads. Each user can go to a particular newsgroup and create a filter to subscribe/unsubscribe particular content to be downloaded. In contrast, a user of an email client gets unwanted content delivered to their inbox. Though the discussion features resemble the present invention to some extent, the present invention solves the problems particular to experiences in an email client, specifically receiving mail in an in-box rather than choosing which posted materials to visit in various repositories.

In view of the foregoing, a need exists to overcome these problems by providing a system and method for managing email threads, and, more particularly, to a system and method for easily allowing users to suppress or otherwise control specific aspects of email threads using a single click from the user's UI.

BRIEF SUMMARY OF THE INVENTION

The present invention provides various simple and easy ways for each end user to manage the thread in a way that suits them. The user experience requires only a single click on the user interface.

The present invention allows users to suppress or otherwise control specific aspects of email threads with a single-click button user interface. Additional embodiments allow user to manage inbox space, recover suppressed threads, be alerted on contextual changes of such threads, and so forth.

The system allows the user to specifically configure his/her own email thread management scheme by selecting an email and choosing "Suppress Thread" on his/her user interface. The system then performs a number of steps such as examining MIME headers, such as the <message-id> and <references> headers of the selected email, to configure the suppress filter. Once configured, the system uses the suppress filter to examine each email as it is received and examine its <message-id> and <references> headers per RFC 822. If the headers match the configured <message-id> and <references> headers, the emails will be suppressed in the manner chosen by the user such as deletion or move to folder. The logic works as follows. The user receives an email with a unique <message-id> field. Assuming that this is the first email from this thread, the <references> fields at this point will be empty or non-existent. If the user decides to suppress all the emails related to this thread (meaning all responses to this email), the system would create a suppression filter for the <message-id>. When an another user replies to this email using "reply all", the email that gets generated will have a new unique <message-id> and the old <message-id> of the original email will be copied into <references> field. The <references> field contains the old <message-ids> of all the emails belonging to the thread. This is how the relationship between emails in the same thread is kept.

When the user with the supression filter receives the above mentioned email. System will check if the <message-id> in the suppression filter matches any of the <message-ids> in the <references> field of the new incoming email. If it matches, it means this new email is part of the same thread and actions mentioned previously will happen. If <message-id> does not exist in the <references> field that means this email is not related to the email thread and would be forwarded to the user's inbox.

In another embodiment of the present invention, the system allows the user to configure a suppress filter to filter forks. Suppression of forks is done by using the message-id of the email that "starts" the fork. So, the filter would use that email's <message-id> hence filtering everything in that fork. The user is provided with the option of suppressing "All new messages for this fork" and "All new messages except for this fork", although other options are available.

In another embodiment of the present invention, the system recognizes that there has been a context change in the suppressed email thread and provides feedback to the user that the context of the email thread has changed. The system then provides feedback to the user of the context change allowing them to recover the suppressed message or thread.

In another embodiment of the present invention, the system provides, to the user, options when an email matches a predefined suppress filter and there is a context change. The options include, among others, allowing the user to choose to review the current mail of the suppressed thread, to review the complete suppressed thread, to review the suppressed thread summary, or to do nothing.

The illustrative aspects of the present invention are designed to solve one or more of the problems herein described and/or one or more other problems not discussed.

BRIEF DESCRIPTION OF THE SEVERAL
VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As used herein, unless otherwise noted, the term "set" means one or more (i.e., at least one) and the phrase "any solution" means any now known or later developed solution. Additionally, the term "data store" means any type of memory, storage device, storage system, and/or the like, which can temporarily or permanently store electronic data, and which can be included in a storage and/or memory hierarchy (collectively referred to herein as a "memory hierarchy") for a computer system.

The present invention provides a system and method for an end user to simply manage an email thread in a way that suits the end user. The user experience requires only a single click or a series of clicks on the user interface.

The invention allows users to suppress or otherwise control specific aspects of email threads, often with a single-click button user interface. Additional embodiments allow user to manage inbox space, recover suppressed threads, be alerted on contextual changes of such threads, and so forth.

Figure 3:
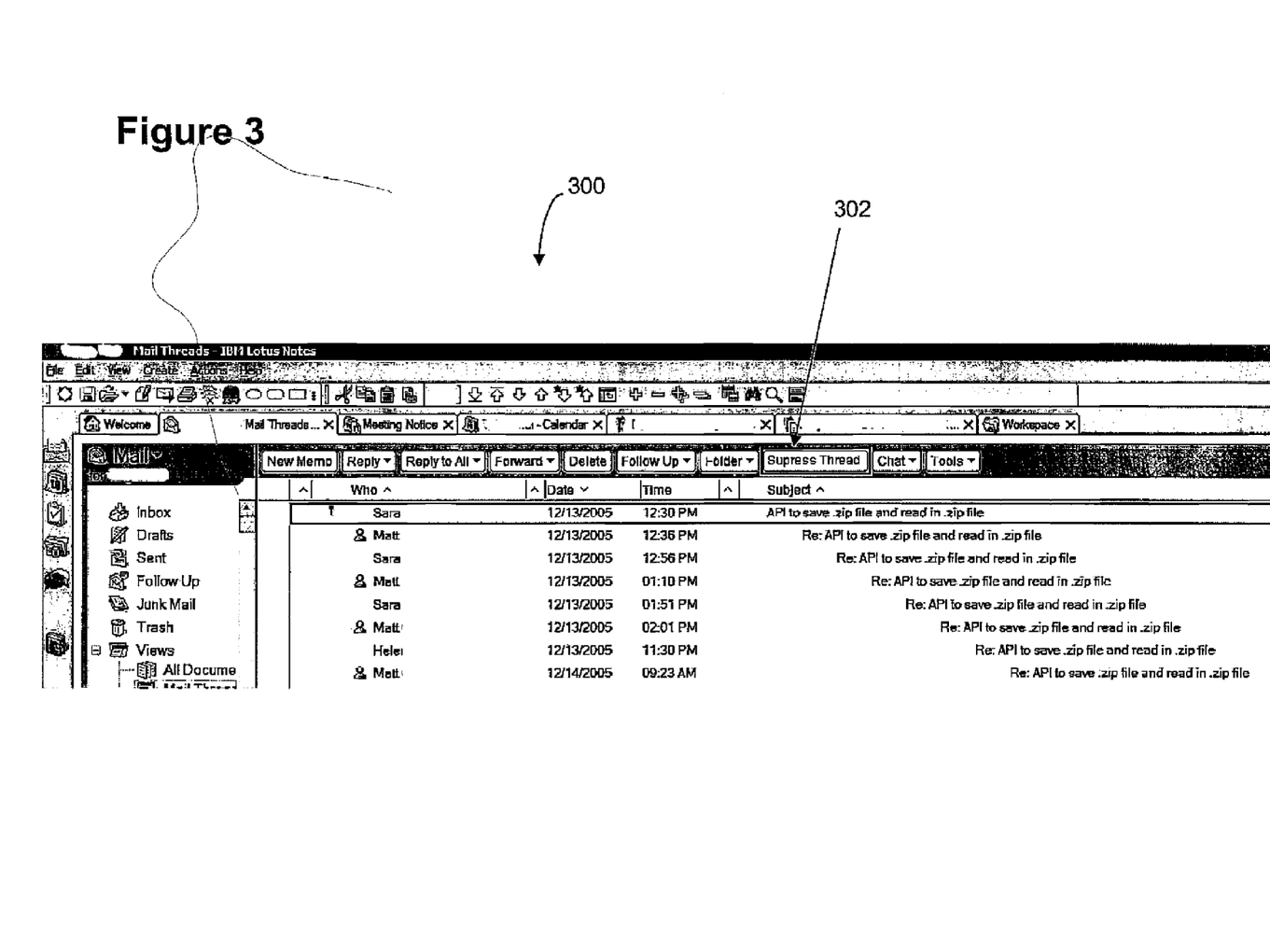
FIG. 3 shows a user interface embodying the concepts of an embodiment of the invention.

In the preferred embodiment of the present invention, by using a button on the user interface of the email user's client "Suppress Thread", user will be able to remove the email thread from his/her inbox with this one click action. This is shown in FIG. 3 where User Interface 300 in an Email Client (such as Lotus® Notes® has a Suppress Thread action button 302.

Suppress Thread functionality utilizes the RFC 822 message-id and references MIME headers to generate the association between emails and their nesting structures. As a matter of background, RFC 822 is an IETF Request for Comments document, released on Aug. 13, 1982 which defined the format of SMTP email. It was obsoleted in April 2001 by RFC 2822. (More information regarding RFC 822 can be found at http://www.faqs.org/rfcs/rfc822.html.) For further background, MIME or Multipurpose Internet Mail Extensions (MIME) is an Internet Standard that extends the format of e-mail to support text in character sets other than US-ASCII, non-text attachments, multi-part message bodies, and header information in non-ASCII character sets. Virtually all human-written Internet e-mail and a fairly large proportion of automated e-mail is transmitted via SMTP in MIME format. (Simple Mail Transfer Protocol (SMTP) is, of course, the de facto standard for e-mail transmissions across the Internet. Formally SMTP is defined in RFC 821 (STD 10) as amended by RFC 1123 (STD 3) chapter 5. The protocol used today is also known as ESMTP and defined in RFC 2821. More information on SMTP can be found here: http://tools.ietf.org/html/rfc2821.) Internet e-mail is so closely associated with the SMTP and MIME standards that it is sometimes called SMTP/MIME e-mail. The content types defined by MIME standards are also of growing importance outside of e-mail. MIME is also a fundamental component of communication protocols such as HTTP, which requires that data be transmitted in the context of e-mail-like messages, even though the data may not actually be e-mail. More detail on MIME can be found here: http://mgrand.home.mindspring.com/mime-.html.

With respect to the Message-ID header, per RFC 822, "This field contains a unique identifier (the local-part address unit) which refers to THIS version of THIS message. The uniqueness of the message identifier is guaranteed by the host which generates it. This identifier is intended to be machine readable and not necessarily meaningful to humans. A message identifier pertains to exactly one instantiation of a particular message; subsequent revisions to the message should each receive new message identifiers."

With respect to the References header, per RFC 822, "The contents of this field identify other correspondence which this message references. Note that if message identifiers are used, they must use the msg-id specification format."

Figure 4:
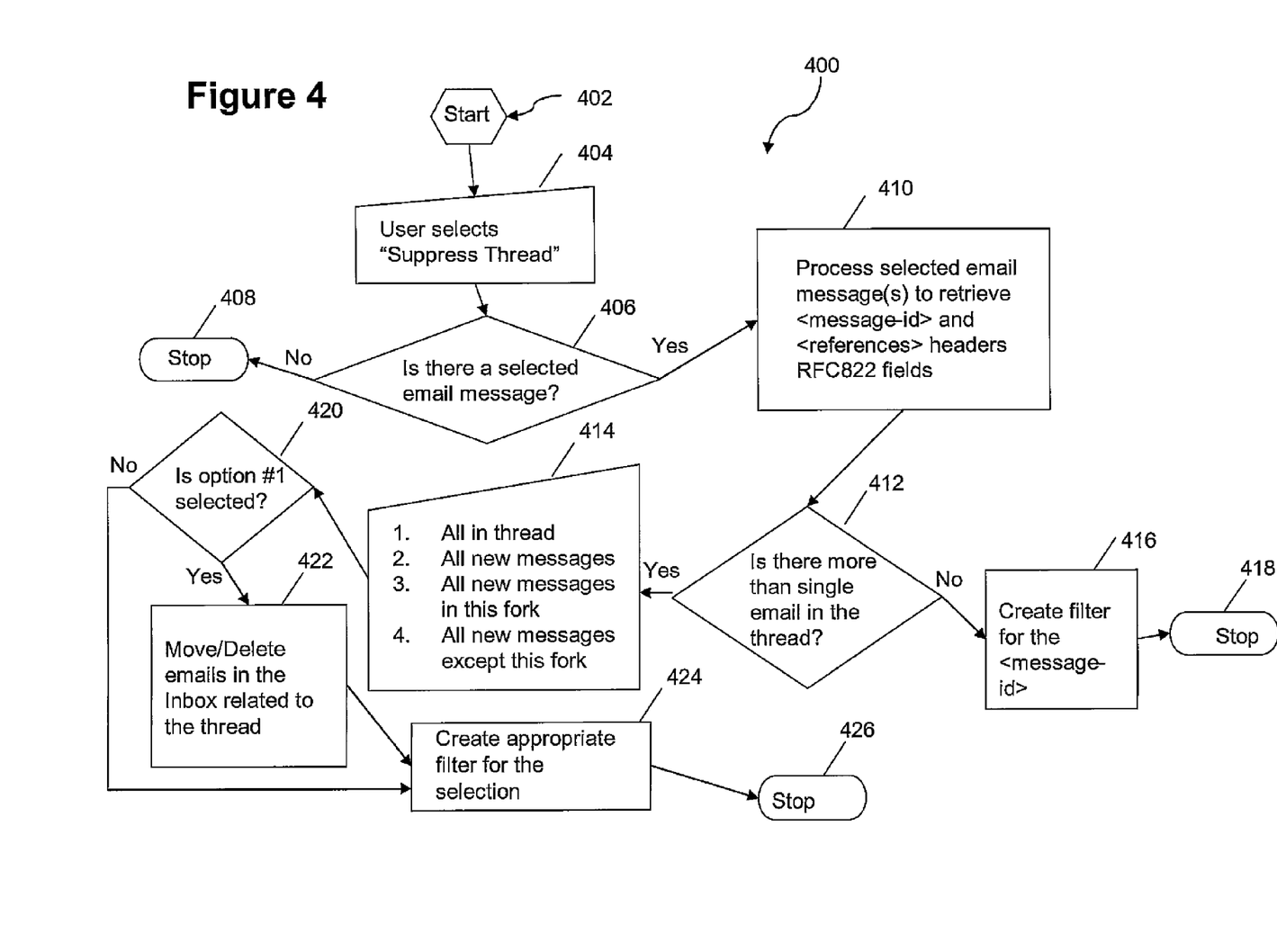
FIG. 4 shows an illustrative process flow diagram when the user clicks on or selects the "Suppress Thread" button according to an embodiment of the invention.

Referring again to the figures, FIG. 4 shows the process 400 of the preferred embodiment to configure the suppress thread function. Process 400 starts at 402 and continues to 404 where the user clicks on or presses the "Suppress Button" 302 (as in FIG. 3). At 406, the system must determine whether the user has selected an email and, if not, the process 400 ends at 408. If the user has selected an email, the system processes the email message or messages and retrieves the <message-id> and the <references> headers at 410. At 412, it is determined whether there is more than a single email in the thread. If not, at 416, a filter is created for the <message-id>. If there is more than a single email in the thread, at 414, the system queries the user as to which messages in the thread are to be suppressed such as "All in thread", "All new messages", "All new messages for this fork", and "All new messages except for this fork". Other options are available as well. At 420, it is determined whether "All in thread" selection is made by the user. If not, at 424, a filter is created for the user's selection and then, at 426, the process has completed. If so, at 422, all of the emails in the inbox related to this thread are optionally moved or deleted depending upon the user's previously set preferences, that is, the user could still leave previously-received emails visible, while suppressing all future ones for the thread. The process then moves on to 424 and 426 as discussed above.

Figure 5:
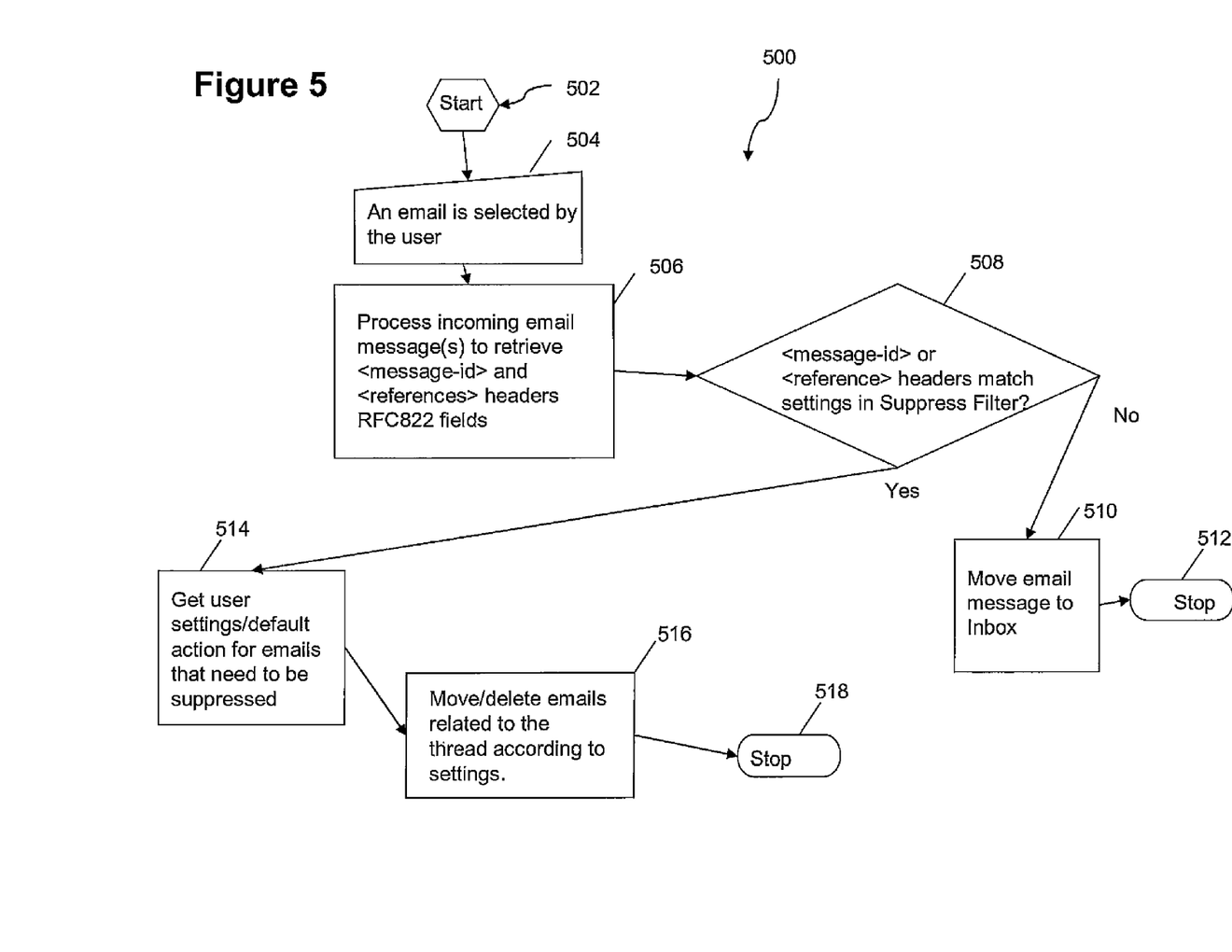
FIG. 5 shows an illustrative process flow diagram for filtering emails when the "Suppress Thread" button has previously been selected according to an embodiment of the invention.

FIG. 5 illustrates the Process 500 associated with the system when an email is received after the "Suppress Button" 302 has been pressed by the user and selections made. After Start 502, the email is received at 504 and is processed at 506. The processing step 506 includes retrieving and inspecting the <message-id> and <references> headers per the RFC 822. At 508, the <message-id> and <references> headers are compared against the <message-id> and <references> headers in the user's suppress filter. If they don't match, at 510, the email is delivered to the user's mailbox and the process ends at 512. If so, at 514, the system retrieves the user settings or default settings for emails which need to be suppressed. At 516, the emails are moved/deleted related to this thread according to the retrieved settings and the process ends at 518.

Figure 6:
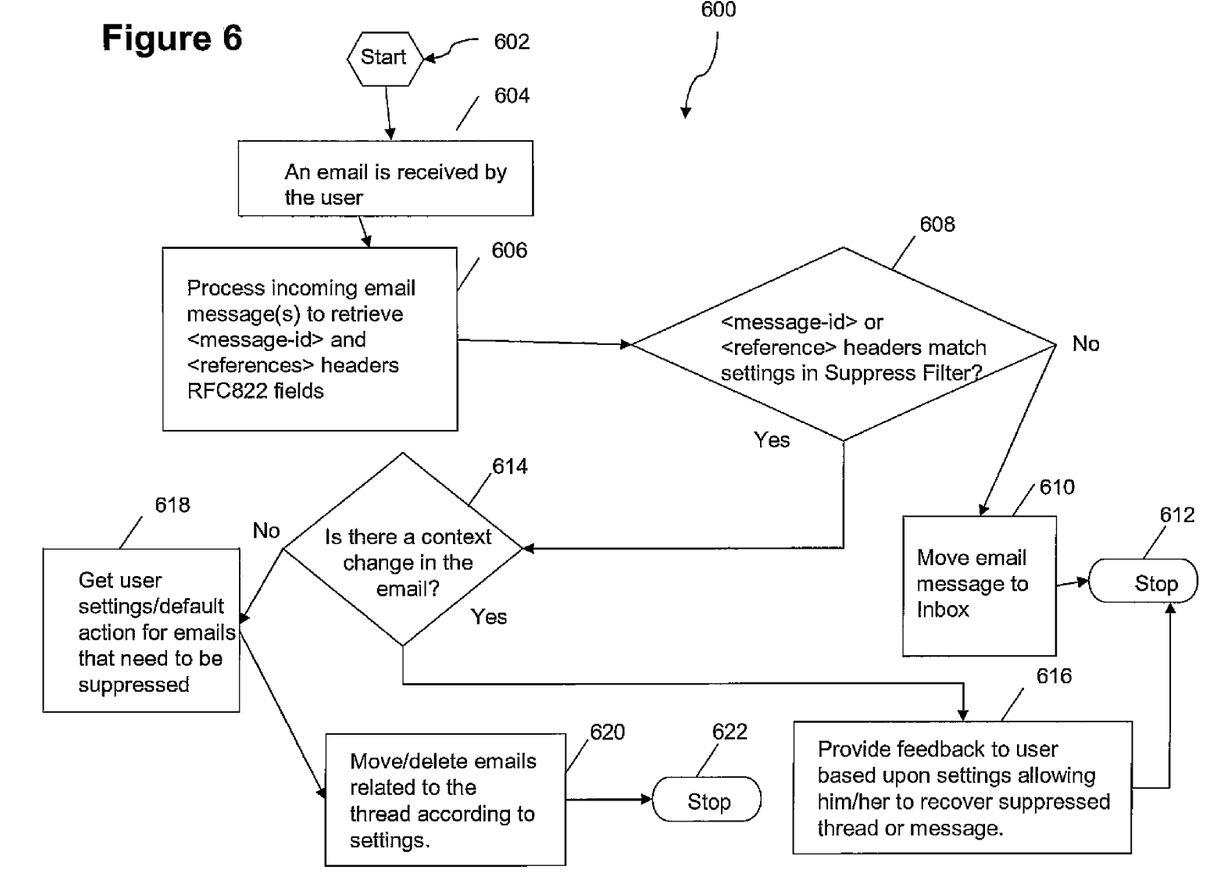
FIG. 6 shows an illustrative process flow diagram when there has been contextual change recognition according to an embodiment of the invention.

FIG. 6 illustrates Process 600 associated with the system when an email is received after the "Suppress Button" has been pressed by the user and selections made but is a different scenario than Process 500. In Process 600, the email received has a context change and is processed as will be discussed below. After Start 602, the email is received at 604 and is processed at 606. The processing step 606 includes retrieving and inspecting the <message-id> and <references> headers per the RFC 822 of the received email. At 608, the <message-id> and <references> headers are compared against the <message-id> and <references> headers in the user's suppress filter. Specifically, when the user with the suppression filter receives the above mentioned email, the system will determine whether the <message-id> in the suppression filter matches any of the <message-ids> in the <references> field of the new incoming email. If there is a match, the new email is part of the same thread and actions mentioned previously will be taken. If <message-id> does not exist in the <references> field, the new email is not related to the email thread and is forwarded to the user's inbox. This is shown at 610 where, if there is no match, the email is delivered to the user's mailbox and the process ends at 612. If there is a match, at 614, the system determines whether there has been a context change in the email. Examples of a context change are moving a user's name from either the "cc" or the "bcc" fields in the email message to the "To" field indicating that the email is now directly addressed to the user which may require his/her attention; inclusion by implicit group to explicit addition of user's email address; or change in the subject line. Context changes could also be based on changes of message topic, based on content analysis and comparison to the topics of previous messages in the thread. If not, at 618, the system retrieves the user settings or default settings for emails which need to be suppressed. Then, at 620, the emails are moved/deleted related to this thread according to the retrieved settings and the process ends at 622. If there has been a context change in the email thread, at 616, feedback is provided to the user, depending upon the user's settings, allowing the user to recover the suppressed thread or message. The process then moves on to steps 618, 620, 622 as discussed above.

Figure 7:
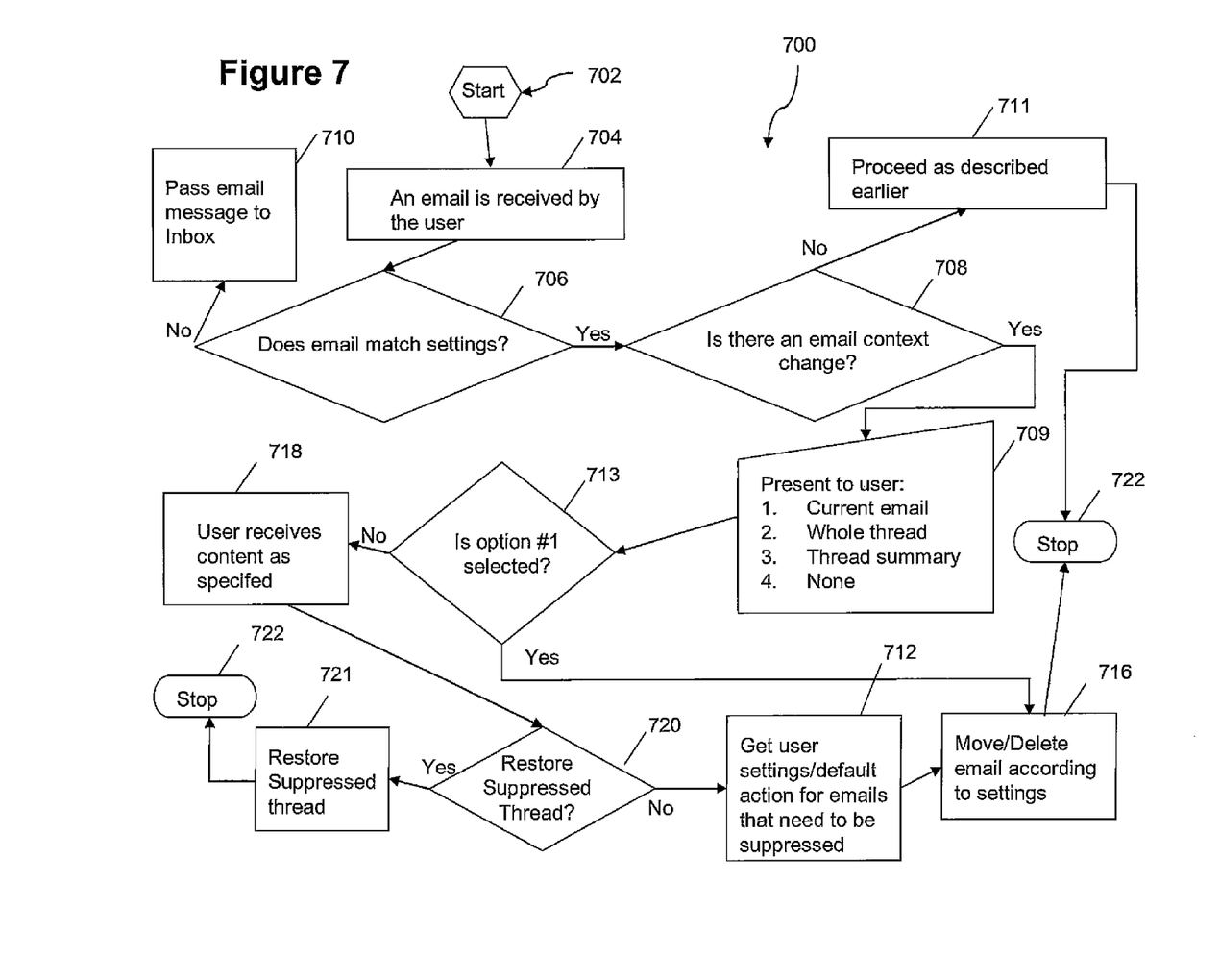
FIG. 7 shows an illustrative flow process diagram of the suppress process according to an embodiment of the invention.

FIG. 7 illustrates Process 700 associated with the system when an email is received after the "Suppress Button" 302 has been pressed by the user and selections made but is a different scenario than both Process 500 and Process 600. In Process 700, the email received has a context change and the user is given a number of options on how to process the email as will be discussed below. After Start 702, the email is received at 704 and is processed at 706. At step 706, the system determines whether there is a match between the RFC 822 headers of the received email and the RFC 822 headers in the user's suppress filter. If there is no match, at 710, the received email is passed to the user. If there is a match, at 708, the system determines whether there has been a context change to the thread. If there is no context change, the system proceeds as earlier described. If there is a context change, at 709, options are presented to the user such as in the form of "There has been a context change in one of the suppress threads. Would you like to review:
  Current email
  Whole thread
  Thread Summary
  None[

The user, of course, makes a selection of these options. (There could be other options as well.) At 718, it is determined whether selection #1 ("Current email") has been selected. If so, at 712, the system retrieves the user settings or default settings for emails which need to be suppressed. Then, at 714, the emails are moved/deleted related to this thread according to the retrieved settings and the process ends at 722. If selection #1 ("Current email") has been selected, at 718, user receives content as specified. At 720, the user is offered the option to "Restore Suppressed Thread?". If the user selects "Yes", at 721, all of the emails related to this thread are restored to the user's email box and the process ends at 722. If the user selects "No" at 720, then steps 712, 714, 722 are followed as discussed above. When a user clicks on this action email client will keep track of the requested thread and never show it in users inbox.

After clicking the Suppress Thread button, the user can be presented with a user interface providing options about which part(s) of the thread to suppress. Examples include, but are not limited to, "all of the thread", "one or more forks in thread", "all emails above selections", "all emails below selection", "all items from this person", etc.

Options for what happens to suppressed threads can be set by a user specified global option, a user interface pop up during suppression, etc. Possibilities include "delete threads", "move to deleted folder", "move to junk folder", "move to <<user specified folder>>", "leave on server don't replicate", etc. Additional functionality to recover such threads, for example "Recover Suppressed Thread", can also be provided. It should be clear that a suppressed thread can be restored without having to be alerted by the context change logic. That is, the user can go to any view of suppressed emails and choose to restore "all", "fork", etc., for the suppressed thread. While the restore logic has only been shown for the context change case, restore does not depend on context change.

Additional thread watches can be provided to alert the user if the thread context changes and to allow the user to remove thread suppression, recover old emails in the thread, etc. Changes in thread context might include, but are not limited to, change of distribution list, explicit addition of a user's (or other users') email address to TO: field, explicit mention of a user's (or other users') credentials in the email content (such as mention of Tolga Oral when someone directs a question to Tolga).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method, in an email system, for allowing a first user to select an email, belonging to an email thread, on a user interface and for automatically suppressing emails addressed to the first user related to the selected email and belonging to the email thread, the email system having a thread suppress filter with suppression settings, the method comprising:

receiving, from the first user, a selection of an email belonging to the email thread;

receiving, from the first user, suppression settings;

receiving, from the first user, an indication that a thread suppress control button on the user interface has been selected by the first user;

receiving, from a second user, an email addressed to the first user;

determining whether the received email belongs to the same email thread as the selected email according to the suppression settings; and if so, acting upon the received email based upon the thread suppress filter suppression settings, the acting comprising deleting the received email or moving the received email to a predetermined folder, thereby suppressing the received email belonging to the email thread;

wherein the determining further comprises examining MIME <message-id> and MIME <references> headers of the received email to determine whether the received email belongs to the same email thread as the selected email according to the suppression settings, wherein the MIME headers are used to determine an email thread which is characterized by a common sender/recipient list.

2. The method of claim 1, after the determining step, further including the step of, if not, delivering the received email to the first user.

3. The method of claim 1 further including the step of examining the received email to determine whether there is a context change in the received email and providing feedback to the first user based upon whether there is a context change.

4. The method of claim 1 further including the step of allowing the user to view the current email, to view the suppressed thread or to view a suppressed thread summary.

5. The method of claim 1 further including the step of allowing the user to restore a suppressed thread or a portion of a suppressed thread.

* * * * *